(12) United States Patent
Schulze et al.

(10) Patent No.: US 6,211,472 B1
(45) Date of Patent: Apr. 3, 2001

(54) FLAT ELECTRONIC SCALES

(75) Inventors: Werner Schulze; Stefanie Meyer; Steffen Hirche, all of Goettingen; Matthias Eger, Wollbrandshausen, all of (DE)

(73) Assignee: Sartorius Aktiengesellschaft, Goettingen (DE)

( * ) Notice: Subject to any disclaimer, the term of this patent is extended or adjusted under 35 U.S.C. 154(b) by 0 days.

(21) Appl. No.: 09/192,117

(22) Filed: Nov. 13, 1998

(30) Foreign Application Priority Data

Dec. 19, 1997 (DE) .............................. 197 56 719

(51) Int. Cl.[7] .......................... G01G 23/02; G01G 3/14; G01G 3/08
(52) U.S. Cl. .......................... 177/154; 177/211; 177/229; 73/862.634
(58) Field of Search .................... 177/211, 229, 177/124, 154, 157, 158, 238; 73/862.627, 862.632, 862.634

(56) References Cited

U.S. PATENT DOCUMENTS

| | | | |
|---|---|---|---|
| 3,667,560 | * | 6/1972 | Cooke ................................... 177/211 |
| 3,949,822 | * | 4/1976 | English et al. ........................ 177/126 |
| 4,177,868 | * | 12/1979 | Sanders et al. ....................... 177/211 |
| 4,381,826 | * | 5/1983 | Kupper ................................. 177/211 |
| 4,396,079 | * | 8/1983 | Brendel ................................ 177/154 |
| 4,433,741 | * | 2/1984 | Ryckman, Jr. ........................ 177/211 |
| 4,515,232 | * | 5/1985 | Rubinstein ............................ 177/154 |
| 4,583,607 | * | 4/1986 | Freeman ............................... 177/244 |
| 4,598,781 | * | 7/1986 | Tramposch ........................... 177/211 |
| 4,653,822 | * | 3/1987 | Kanazawa et al. ................... 339/17 |
| 4,726,435 | * | 2/1988 | Kitagawa et al. .................... 177/154 |
| 4,800,973 | * | 1/1989 | Angel ................................... 177/211 |
| 4,848,493 | * | 7/1989 | Hitchcock ............................ 177/211 |
| 4,949,799 | * | 8/1990 | Wernimont ........................... 177/211 |
| 4,993,506 | * | 2/1991 | Angel ................................... 177/211 |
| 5,072,799 | * | 12/1991 | Freeman et al. ...................... 177/154 |
| 5,308,934 | * | 5/1994 | Miller et al. .......................... 177/244 |

(List continued on next page.)

FOREIGN PATENT DOCUMENTS

2009858 * 1/1971 (DE) .
4427088 * 2/1996 (DE) .

*Primary Examiner*—Randy W. Gibson
(74) *Attorney, Agent, or Firm*—Sughrue, Mion, Zinn, Macpeak & Seas, PLLC

(57) ABSTRACT

A top-loading balance with a housing, a weighing pan, and a load receptor, wherein the load receptor is connected with a system carrier by a parallel guidance having an upper guide and a lower guide. The system carrier is fixed relative to the housing. One of the guides is divided into two part-guides which, seen in plan view, are disposed preferably on either side of the undivided guide so that the guides do not overlap. In addition, the load receptor, the guides and the system carrier preferably form an integral component. The top-loading balance also includes strain gauges on at least one of the guides to generate a load-dependent electrical signal, which can be measured and converted into e.g. a visual display of the mass. The integral component has two cavities for batteries and the system carrier extends between the two battery cavities. Furthermore, the load receptor is constructed to be approximately U-shaped and the two limbs of the U are disposed laterally near the battery cavities. In addition, the strain gauges are arranged only on the inner side of the undivided guide. Therefore, the top-loading scale is flat and compact without compromising the stability of the scale. Preferably, the balance includes features, such as overload abutments, that protect the delicate parallel guidance, as well as features that ensure accurate measurement of off-center loads.

21 Claims, 2 Drawing Sheets

U.S. PATENT DOCUMENTS

| | | | | |
|---|---|---|---|---|
| 5,319,161 | * | 6/1994 | Miller et al. | 177/154 |
| 5,425,278 | * | 6/1995 | Perkins | 177/211 |
| 5,510,581 | * | 4/1996 | Angel | 177/211 |
| 5,521,334 | * | 5/1996 | Freeman | 177/154 |
| 5,719,357 | * | 2/1998 | Eger et al. | 177/184 |
| 5,786,549 | * | 7/1998 | Serizawa | 177/211 |
| 5,847,329 | * | 12/1998 | Anthoine-Milhomme et al. | 177/211 |
| 5,929,391 | * | 7/1999 | Petrucelli et al. | 177/211 |

\* cited by examiner

FLAT ELECTRONIC SCALES

FIELD OF THE INVENTION

This invention relates to electronic scales. More specifically, this invention relates to portable, battery-operated scales which have a flat construction without significantly reducing the stability of the scale.

BACKGROUND OF THE INVENTION

Weighing instruments measure the mass of an object by measuring its weight. In a strain-gauge balance, the electrical properties of materials change when the material is stressed by either compression or extension as a result of a change in length, cross-section, and specific resistance. Strain-gauges are usually positioned at four different points in a double bending beam. Because a double bending beam incorporates parallel guides, it counters the effects of torque resulting from off-center loading. A value for a weight and therefore a mass is derived from the voltage generated when the four strain-gauges form part of a Wheatstone bridge.

The idea of strain-gauges, that is, measuring the stress, caused by the weight of an object on the structure supporting the object, is also used in several scale designs capable of handling varying weights. Larger loads, for example, may be measured by testing the deformation and stress on a solid cylindrical "spring body." This type of scale can handle loads in excess of a ton.

Weighing scales, weighing instruments or balances of this kind are known from, for example, German Patent Application DE 44 27 088 A1 (U.S. Pat. No. 5,719,357) or, with the exception of the integral construction for the load receptor, guides and system carrier, also from German Patent DE 20 09 858 C1 (U.S. Pat. No. 3,667,560).

It is a disadvantage of the known constructions that the weighing system or scale requires relatively large space.

OBJECTS OF THE INVENTION

It is therefore one object of the invention to develop a balance that is portable and battery-operated. In particular, the flattest possible mode of construction is desired without significantly reducing the stability of the balance.

SUMMARY OF THE INVENTION

The invention relates to a top-loading balance with a housing, a weighing pan, and a load receptor. According to one formulation of the invention, the load receptor is connected with a system carrier by a parallel guidance consisting of an upper guide and a lower guide. The system carrier is fixed relative to the housing. One of the guides is divided into two part-guides which, seen in plan view, are disposed preferably on either side of the undivided guide so that the guides do not overlap. In addition, the load receptor, the guides and the system carrier preferably form an integral component. The top-loading balance also includes strain gauges on at least one of the guides to generate a load-dependent electrical signal.

According to one aspect of the invention, the integral component has two cavities for batteries and the system carrier extends between the two battery cavities. Furthermore, the load receptor is constructed to be approximately U-shaped and the two limbs of the U are disposed laterally near the battery cavities. In addition, the strain gauges are arranged only on the inner side of the undivided guide.

A space-saving arrangement results from this design of the integral component. The system carrier is disposed substantially between the batteries, and parts of the load receptor are arranged around the batteries. Due to the arrangement of the strain gauges on the inner side of the one guide, the physical height of the entire balance hardly needs to be higher than the vertical spacing of the upper and lower guide. Since there is no need to provide the strain gauges, including their wires, on the outer side of the one guide, strain gauges on the outer side are superfluous.

BRIEF DESCRIPTION OF THE DRAWINGS

Preferred embodiments of this invention will be described in detail below in connection with the following drawings, in which like numbers refer to like objects.

DETAILED DESCRIPTION OF THE PREFERRED EMBODIMENT

During normal operation, the weighing pan is supported by parts of an integral component. The integral component is supported only via parallel guides. Thus, the load is accurately weighed regardless of torque.

Figure 1:
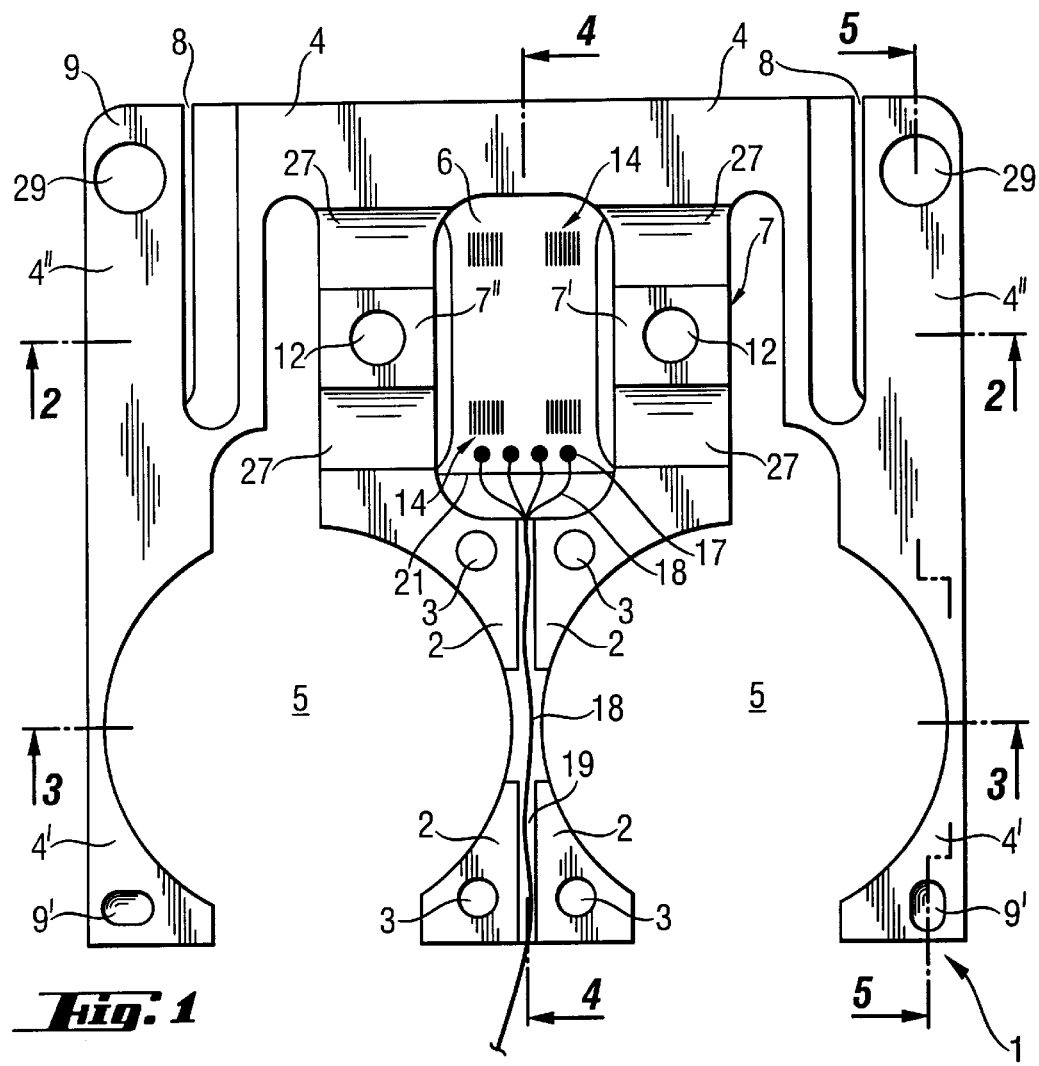
FIG. 1 shows an integral component, forming a load receptor, guides and a system carrier, in top plan view.

The integral component 1 shown in FIG. 1 includes a system carrier 2, which has holes 3 so that it can be, for example, screw-connected to a housing. The housing is not shown in FIG. 1. Moreover, the integral component comprises a load receptor 4/4', which is constructed to be approximately U-shaped. Lateral limbs 4' of the load receptor are shaped such that circular cavities or passages 5 are left between each limb 4' and the system carrier 2 to receive batteries. Finally, the integral component comprises a lower guide 6 and an upper guide 7, wherein the upper guide is divided into two part-guides 7'-7". The two guides 6 and 7, form, in a known manner, a parallel guidance, which connects the load receptor 4 with the system carrier 2. The system carrier 2 is fixed relative to the housing and the load receptor 4 is moveable in a vertical direction.

Figure 2:
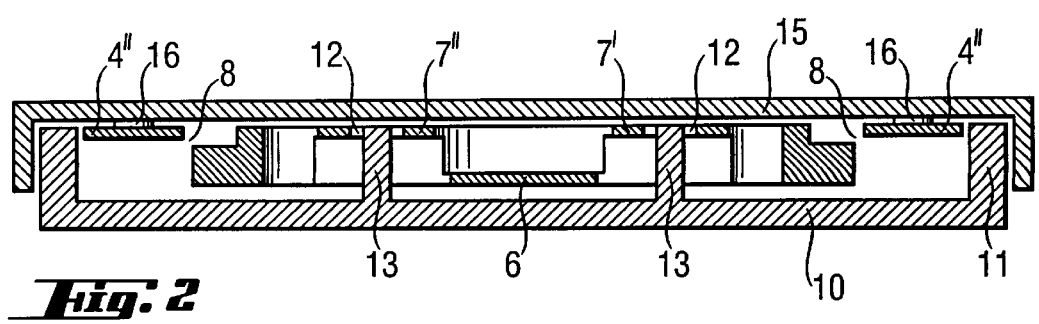
FIG. 2 is a section through the integral component of FIG. 1 taken along the dashed line 2—2 in FIG. 1, as well as through a housing and through a weighing pan.
Figure 4:
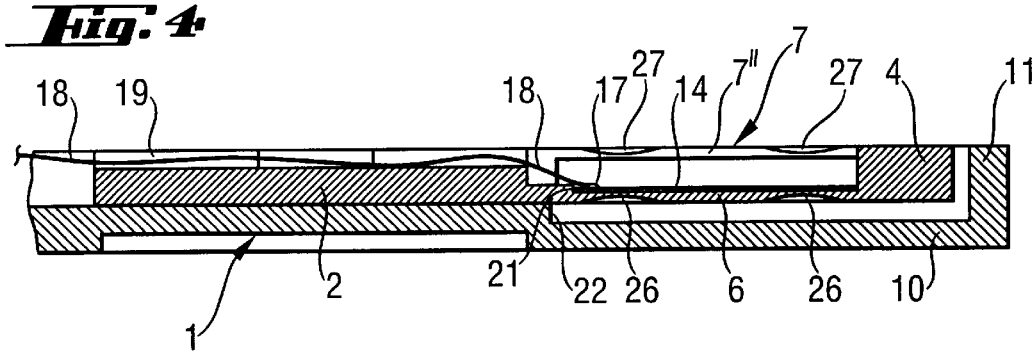
FIG. 4 is a section through the integral component of FIG. 1 along the dashed line 4—4 in FIG. 1 and through the housing.

The vertical arrangement of the lower guide 6 and the upper guide 7 can be seen in FIGS. 2 and 4. FIG. 2 is a vertical section along the line 2—2 of FIG. 1, and FIG. 4 is a vertical section long the line 4—4 of FIG. 1. The lower guide 6 is disposed on an underside of the integral component 1, and the upper guide 7 is disposed on an upper side thereof. Thereby, the vertical spacing between the upper and the lower guide is as large as possible wherein the thickness of the integral component is predetermined. Strain gauges 14 are mounted only on an upper side of the lower guide 6 and therefore extend—just as associated solder support points (reference numeral 17 in FIGS. 1 and 4) and an associated wiring (leads 18 in FIGS. 1 and 4)—only into the interior space of the integral component 1. Therefore, the strain gauges do not increase the physical height of the balance, as strain gauges on the underside of the lower guide 6 would do.

A weighing pan 15 is supported in normal weighing operation at four locations on the load receptor 4/4'/4". Disposed in the two limbs 4' of the load receptor are respective recesses 9' (recognizable in FIGS. 1 and 5), into which hemispherical protrusions 16' on an underside of the weighing pan 15 project. The protrusions also secure the weighing pan against lateral forces. The weighing pan 15 is supported on each of arms 4" only by a respective round intermediate member 16 (recognizable in FIGS. 2 and 5) at a support point 9 (FIG. 1).

The force transmitted from the weighing pan 15 to the load receptor 4 leads to a resilient bending of the guides 6 and 7. The force, in turn, is converted by the strain gauges 14 on the guide 6 into an electrical signal. This electrical signal is amplified in an electronic system, digitalized and displayed on a display unit. All these electronic parts of the balance are known and therefore not explained in detail herein.

FIG. 2 also shows measures for securing the weighing machine against overloading. In case of an overload, the weighing pan 15 is supported on side walls 11 of the housing 10/11. In addition, the housing (housing base) 10 has two supports (protrusions) 13, which extend through holes (passages) 12 in the divided guides 7' and 7". The supports 13 also support the middle regions of the weighing pan 15 in case of overloading and thus prevent a bending of the weighing pan 15. Corresponding supports can also be provided at other locations of the housing 10. Moreover, the arms 4", which are separated from the rest of the load receptor 4 by slots 8, do not have the full height of the rest of the integral component 1. The arms 4" are thereby weakened to such an extent that their spring constant is just as large as the spring constant of the limb 4' of the load receptor. The weighing pan 15 thereby lowers in a tilt-free manner when centrally loaded. The arms 4" and the limbs 4' are, moreover, so flexible that the forces, which are transmitted to the load receptor 4 when the weighing pan 15 rests on its overload abutments, do not overload the guides 6 and 7. Alternatively, the necessary flexibility of the arms 4" and the limbs 4' can be achieved by narrower construction.

Figure 3:
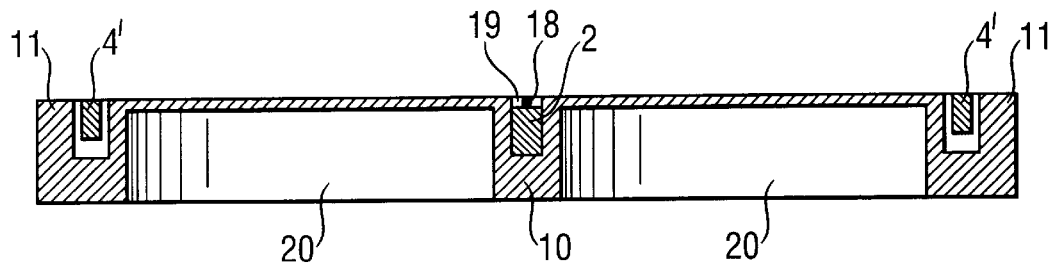
FIG. 3 is a section through the integral component of FIG. 1 along the dashed line 3—3 in FIG. 1 and through the housing.

FIG. 3 illustrates a vertical section through the integral component 1 along the dashed line 3—3 in FIG. 1 and through the housing 10/11. FIG. 3 also shows that the limb 4' can be constructed to be somewhat lower than the rest of the integral component 1. Thereby, uniformity of the spring constants of the limbs 4' and the arms 4" is achieved. Also, this spring constant can be made sufficiently small. Moreover, it can be seen in FIG. 3 that the housing 10 has two battery compartments 20, which extend into the cavities 5 of the integral component 1. The battery compartments 20 bear against the same system carrier 2 and thus increase the stiffness thereof, even though they are, of course, spaced from the limbs 4' of the load receptor. The two batteries are inserted from below into these battery compartments 20. Means for electrical contacting and closure caps for the battery compartments, which are known, are, for reasons of clarity, not shown. The battery compartments 20 not only increase the stability of both the housing 10/11 and the system carrier 2 that is fixed relative to the housing, but they also serve as a large-area overload abutment for the weighing pan 15.

Furthermore, FIGS. 1, 3 and 4 show a groove 19 in the system carrier 2, in which leads 18 for connecting the strain gauges 14 are placed. Thereby, these feed leads do not increase the physical height of the balance. The strain gauges 14 can consist of, for example, four individual strain gauges on a common foil. As a positioning aid for the gluing of the strain gauges foil, a small step 21 on the upper side of the lower guide 6 is shown in FIGS. 1 and 4. During gluing, the strain gauges foil is pushed against this step 21 and fixed there.

Further, FIG. 4 depicts that some material was milled away or ground away from the lower guide 6 at the areas 26 so as to produce defined thin areas at the guide 6. The same applies to the upper guides 7' and 7", where some material was removed from the top at areas 27. The areas 27 can also be recognized in FIG. 1. The present invention can be made to function equally well without such milling at the locations 26 and 27. In this case, the guides 6 and 7 may be made somewhat thinner overall so as to act as bending springs over their entire length. If necessary, a corner load adjustment can also be carried out, in a known manner, by slightly grinding away material at the locations 26 and 27.

Finally, a step 22 in the housing 10 is shown in FIG. 4. On the left of the step 22, the system carrier 2 is fastened directly to the housing 10, while on the right of the step 22, the guide 6 and the load receptor 4 have room to move under load. In case of overloading, however, the load receptor 4 is supported by the housing 10.

Figure 5:
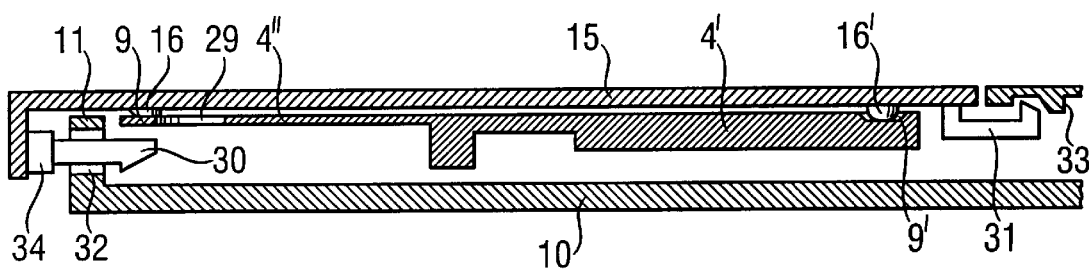
FIG. 5 is a section through the integral component of FIG. 1 along the dashed lines 5—5 in FIG. 1, through the housing, and through the weighing pan.

FIG. 5 illustrates a vertical section through the integral component 1 of FIG. 1 along the dashed line 5—5, through the housing 10, and through the weighing pan 15. FIG. 5 also shows how the weighing pan 15 can be mounted, secured against lifting off, and locked if the balance is not used. The weighing pan has two latches 30, which are pushed into two corresponding holes 32 in the housing side wall 11 during mounting, and two latches 31, which are pushed into corresponding openings in the housing near the weighing pan. The latches 30 and 31 have, in normal weighing settings shown in FIG. 5, play in all directions. In spite of this play, the latches 30–31 secure the weighing pan 15 against lifting off. If the balance is not used, the weighing pan 15 can then be locked through lateral displacement (to the right in FIG. 5). The latches 30 are thereby fixed by their bulge 34 in the holes 32, and the latches 31 latch behind projections 33. The round intermediate members 16 furthermore displace over the holes 29 in the arms 4" of the load receptor. Loading is thereby prevented and no forces can be transmitted to the load receptor. In this locked setting, the weighing pan is held by the latches 31. The weighing pan can be pushed back into its normal weighing setting only by overcoming a detent resistance. Other known locking means can also be employed.

The integral component 1 can, for example, be made from a piece of sheet metal by milling from the top and from the bottom. The integral component 1 can also be installed the other way round so that the upper guide and the lower guide switch positions. Its function does not change by this inversion. The recesses 9' for fixing the weighing pan 15 would then need to be formed on the other side of the integral component 1.

For reasons of clarity, all figures are enlarged. The actual size of the balance may be about the size of a credit card. Use in this application of the terms "flat", "planar" and the like should be understood to describe also such surfaces that have more than a mathematical (i.e. infinitesimal) thickness.

What is claimed is:

1. A top-loading scale, comprising:
 a weighing pan to receive a load;
 a housing;
 an integral component having two cavities to receive two batteries, comprising:
  a parallel guidance having an upper guide and a lower guide, wherein one of the guides is a divided guide split into two partial guides and the other guide is an undivided guide;
a system carrier fixed to the housing and extending between the two cavities; and
a load receiver being connected to the system carrier via the parallel guidance; and strain gauges disposed only on an inner side of the undivided guide to generate an electrical signal dependent on the load on the weighing pan.

2. The top-loading scale of claim 1, wherein the load receiver has a U-shape with two limbs, the two limbs being disposed laterally next to the two cavities.

3. The top-loading scale of claim 1, wherein, in top plan view, the two partial guides are located on both sides of the undivided guide such that the divided guide and the undivided guide do not overlap.

4. The top-loading scale of claim 1, wherein the load receiver further comprises two slots to form two resilient arms having respective support points that support the weighing pan.

5. The top-loading scale of claim 1, wherein the housing comprises protrusions that form overload abutments for the weighing pan.

6. The top-loading scale of claim 5, wherein each of the two partial guides comprises a passage substantially in a center thereof through which a respective one of the protrusions extends.

7. The top-loading scale of claim 1, wherein the housing comprises two downwardly open battery compartments extending into the two cavities of the integral component, and wherein the two battery compartments form overload abutments for the weighing pan.

8. The top-loading scale of claim 2, wherein the housing comprises two downwardly open battery compartments extending into the two cavities of the integral component, and wherein the two battery compartments form overload abutments for the weighing pan.

9. The top-loading scale of claim 1, wherein the system carrier comprises a groove containing electrical leads that connect to the strain gauges.

10. The top-loading scale of claim 1, further comprising a common foil located on the inner side of the undivided guide, on which the strain gauges are arranged.

11. The top-loading scale of claim 10, wherein the inner side of the undivided guide comprises a step receiving an edge of the common foil, for positioning the strain gauges on the undivided guide.

12. The top-loading scale of claim 1, further comprising a detent system configured to fix the weighing pan to the housing when the weighing pan is laterally displaced out of a normal weighing setting.

13. The top-loading scale of claim 12, wherein the detent system comprises:

first latches mounted at the weighing pan;
second latches mounted at the weighing pan;
holes in the housing;
projections mounted at the housing;
protrusions on an underside of the weighing pan; and
recesses in the limbs of the load receiver, wherein, when the weighing pan is fixed to the housing, the first latches of the weighing pan are locked in the holes of the housing, the second latches mounted at the weighing pan are latched behind the projections mounted at the housing, and the protrusions on the underside of the weighing pan are disposed in the recesses in the limbs of the load receiver.

14. An electronic scale for measuring the mass of a load, comprising:

a flat housing having overload abutments;
a system carrier connected to said housing, said system carrier lying substantially in a plane;
a load receptor disposed substantially in said plane;
parallel guides with strain gauges, said parallel guides connecting said load receptor to said system carrier, said parallel guides disposed substantially in said plane, and wherein said load receptor does not contact said housing under normal loads; and
a weighing pan resting on said load receptor, wherein said overload abutments extend through cavities in said parallel guides, and wherein said weighing p an rests on said overload abutments when said load exceeds a certain capacity.

15. The electronic scale of claim 14, wherein said system carrier has at least one battery cavity to receive a battery and wherein said battery is structured to provide a further overload abutment when positioned between said housing and said weighing pan.

16. The electronic scale of claim 14, further comprising a detent system configured to fix the weighing pan to the housing when the weighing pan is laterally displaced out of a normal weighing setting.

17. A top-loading scale, comprising:

a weighing pan that receives a load;
a housing having at least one overload abutment for the weighing pan; and
an integral component, comprising:
a load receptor;
a system carrier fixed to the housing; and
a parallel guidance having an upper guide and a lower guide, wherein one of the guides is divided into two partial guides and the other guide is an undivided guide; and
a plurality of strain gauges on an inner side of the undivided guide that generates an electrical signal dependent on the load on the weighing pan,
wherein the integral component has at least one cavity through which the overload abutment extends.

18. The top-loading scale of claim 17, wherein the parallel guidance has the at least one cavity through which the overload abutment extends.

19. The top loading scale of claim 17, wherein the housing has at least one downwardly open battery compartment, and the load receptor has at least one cavity that receives the battery compartment.

20. A top-loading scale, comprising:

a weighing pan that receives a load;
a housing;
an integral component, comprising:
a load receiver;
a system carrier fixed to the housing; and
a parallel guidance having an upper guide and a lower guide, wherein one of the guides is divided into two partial guides and the other guide is an undivided guide;
a plurality of strain gauges on an inner side of the undivided guide that generates an electrical signal dependent on the load on the weighing pan; and
a detent system configured to fix the weighing pan to the housing when the weighing pan is laterally displaced out of a normal weighing setting.

21. The top-loading scale of claim 20, wherein the detent system comprises:
- first latches mounted at the weighing pan;
- second latches mounted at the weighing pan;
- holes in the housing;
- projections mounted at the housing;
- protrusions on an underside of the weighing pan; and
- recesses in the limbs of the load receiver, wherein, when the weighing pan is fixed to the housing, the first latches of the weighing pan are locked in the holes of the housing, the second latches mounted at the weighing pan are latched behind the projections mounted at the housing, and the protrusions on the underside of the weighing pan are disposed in the recesses in the limbs of the load receiver.

* * * * *